United States Patent
Cepulis et al.

(10) Patent No.: US 8,976,033 B2
(45) Date of Patent: Mar. 10, 2015

(54) CONTROLLER COUPLED TO VISUAL INDICATOR

(71) Applicant: Hewlett-Packard Development Company, L.P., Houston, TX (US)

(72) Inventors: Darren J. Cepulis, Houston, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 13/760,902

(22) Filed: Feb. 6, 2013

(65) Prior Publication Data

US 2014/0218199 A1   Aug. 7, 2014

(51) Int. Cl.
*G08B 21/00* (2006.01)
*H04L 12/24* (2006.01)
*H04L 12/26* (2006.01)

(52) U.S. Cl.
CPC ............ *H04L 41/24* (2013.01); *H04L 43/0817* (2013.01)

USPC ........................................... 340/635; 340/540

(58) Field of Classification Search
None
See application file for complete search history.

(56) References Cited

U.S. PATENT DOCUMENTS

| 7,102,887 | B2* | 9/2006 | Blackwell ...................... 361/695 |
| 7,478,424 | B2 | 1/2009 | Mester et al. | |
| 7,552,217 | B2 | 6/2009 | Mihm et al. | |
| 7,725,742 | B2* | 5/2010 | Hirai et al. .................... 713/300 |
| 2004/0228090 | A1* | 11/2004 | Blackwell ...................... 361/695 |
| 2011/0040917 | A1* | 2/2011 | Lambert et al. ............... 710/301 |
| 2012/0069730 | A1 | 3/2012 | Johnsen | |

* cited by examiner

*Primary Examiner* — Travis Hunnings
(74) *Attorney, Agent, or Firm* — Hewlett-Packard Patent Department

(57) ABSTRACT

Techniques for providing the status of a port to a controller are provided. A port may have a visual indicator indicating the status of the port. A controller may have an input for receiving a signal. The visual indicator of the port may be coupled to the input of the controller to determine the operational status of the port.

14 Claims, 3 Drawing Sheets

CONTROLLER COUPLED TO VISUAL INDICATOR

BACKGROUND

A computer may contain a port to allow for communication with external elements. One ubiquitous example of such a port is an Ethernet port which allows communications with other elements over an Ethernet network. In many cases, a visual representation of the status of the port is provided in close proximity to the port. For example, an Ethernet port may have a light emitting diode (LED) indicator that is in close proximity to where an Ethernet cable plugs into the port. The status of the LED may indicate the status of the port. For example, a solidly lit LED may indicate a link has been established on the port, while a flashing LED may indicate traffic is currently being sent over the port.

DETAILED DESCRIPTION

Figure 1:
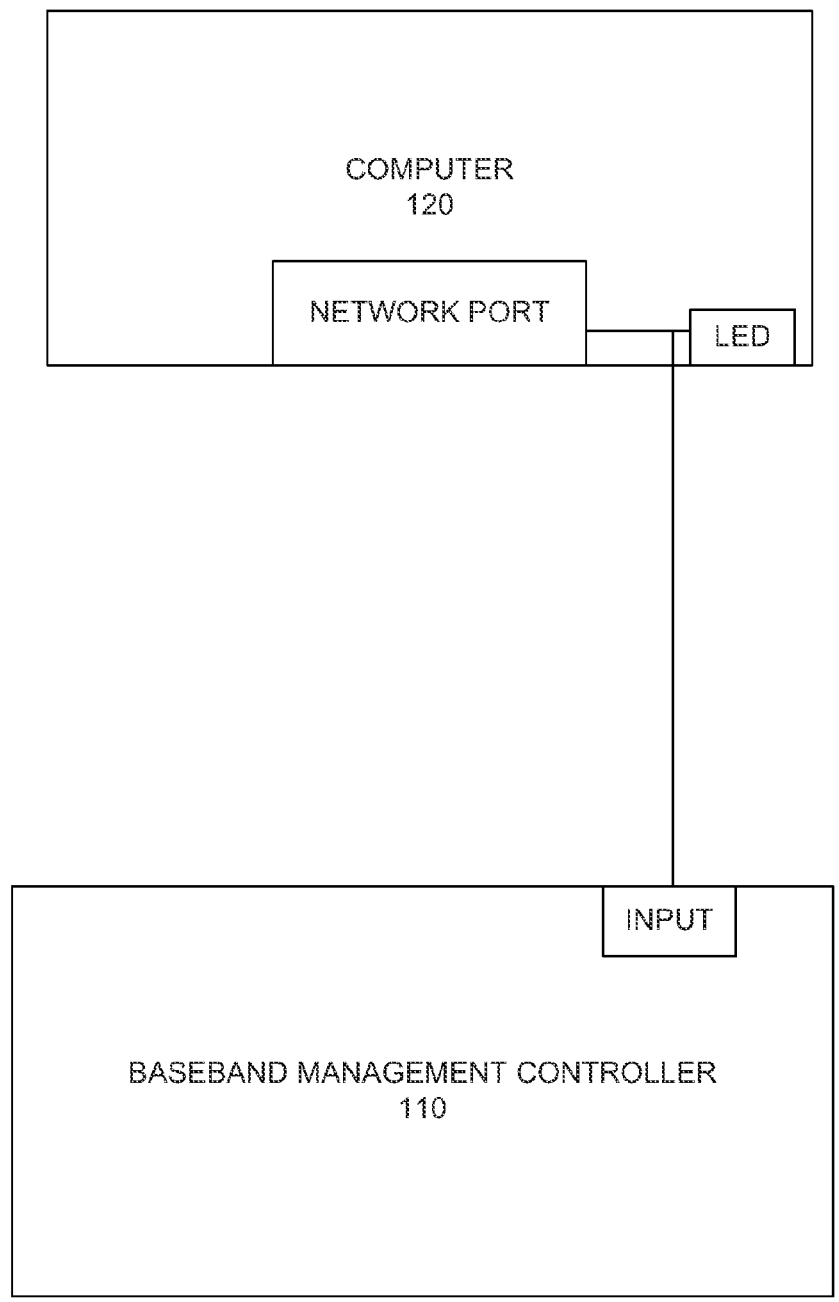
FIG. 1 is an example of a system including a coupling to a visual indicator.

Modern computing systems may be connected to may external systems through the use of various types of network ports. For example, a computer may be connected to an Ethernet network through an Ethernet port. Another example of a network connection is a connection to a storage area network. Such connections may be made through a Fibre Channel (FC), Serial Attached Small Computer Systems Interface (SAS), or a Fibre Channel over Ethernet (FCoE) port. Often times, these ports are integrated onto the motherboard of the computer; although in some cases the port may be included on an expansion card.

Often times, a port will include a device that presents a visual representation of the status of the port. Typically, this visual indication is through an indicator light, such as may be provided by a light emitting diode (LED), for example. For example, most Ethernet cards include an LED that indicates the status of the Ethernet port. A lit LED may indicate a connection to the network has been established. A blinking LED may indicate traffic is currently flowing through the port. There may be multiple LEDs per port, each representing some aspect of the status of the port. The visual indicator may typically be disposed in close proximity to the port itself. For example, in the case of an Ethernet port, the LEDs may be very close to the place where the Ethernet cable plugs into the port.

Although the use of a visual indicator, such as an LED, to provide status of a port is useful, several problems arise. One problem is that in modern data centers, the computing equipment may be contained in a secure area with access limited to a small set of personnel. Maintenance personnel that may have a need to examine the status of the port may not have access to the secure area and thus cannot get close enough to the LEDs to determine status. Furthermore, modern data centers typically pack many hundreds or even thousands of computers in a small area. Identifying the particular LEDs associated with a computer of interest from amongst a sea of LEDs associated with different computers can be difficult. Further exacerbating the problem is that the LEDs are typically disposed on the rear of the computer. Access to the rear of a rack housing many computers in a data center may be extremely difficult. Finally, in many cases, maintenance personnel may be located remotely from the computers being maintained, thus eliminating the ability to view the status of the LEDs without travelling to the physical location of the computer.

The information provided by the LEDs may be available to remote management software through the computer. Typically, software is installed on the computer that is able to monitor the status of the port and report that status to a remote management device. The remote management device may then display the status of the port. However, this scheme for remote display of port status has problems as well. One problem is that the monitoring software generally runs under the control of an operating system. If the operating system has not yet been installed or has failed to properly boot, the remote monitoring software cannot run. Another problem is that there may be cases where the port has a status, even though the computer itself is in a low or no power state. For example, a computer may go into a low power state in which the computer essentially powers off until a packet is received from the network over the port. During this period of time, the computer is not able to run the port monitoring software, even though the port is active and waiting to receive a "wake on LAN" packet.

Techniques described herein overcome the problems described above by providing a mechanism for remotely determining the status of a port, without requiring access to the physical port and without requiring that an operating system on the computer be up and running. Modem server computers typically include a management processor, often referred to as a baseband management processor (BMC). The BMC may be thought of as a processor on the motherboard of a computer that operates somewhat autonomously from the computer for purposes of managing the computer. Typically, the BMC is always running, as long as it receiving power. The operation of the BMC may be independent of the operational status of the computer. For example, the computer may be powered down, but the BMC remains operational. In fact, one of the uses of the BMC is to provide a mechanism to remotely instruct the computer to power up.

The BMC is typically connected to a management network. The management network may allow for management devices, such as management computers, to control operation and retrieve status of the computer. The BMC may also include inputs, such as General Purpose Input/Output (GPIO) pins and Analog to Digital convertor inputs, that are able to receive external signals, such as electrical voltages, and make the status available to the BMC.

As mentioned above, ports may include a visual indicator of the ports status. Typically, this is in the form of an LED. The techniques described herein couple the signal used to drive the on/off state of the LED to one of the inputs of the BMC. The BMC reads this signal and is thus able to determine if the LED is on or off. Because the on/off state of the LED is known, the BMC is also aware of the state of the information the LED represents (e.g. link, collision, etc.). This information may then be conveyed to a remote management device through the management network. The status information for the port provided through the LEDs becomes available remotely. Furthermore, the signals driving the LEDs are independent of the operating system running on the computer. As such, the status information is available remotely even if the operating system of the computer is not running, and in many cases, even if the computer itself is not powered up.

FIG. 1 is an example of a system including a coupling to a visual indicator. System 100 may include a computer 110 and a baseband management controller 130 coupled to the computer. In many cases, the computer and the baseband management controller may be included within a single enclosure and may actually reside on the same motherboard. Although shown as two separate entities, this is for purposes of depicting the functionality provided by each element as being independent of one another, regardless of the actually physical placement of the elements.

The computer 110 may include a network port 112. For example, the network port may be an Ethernet port, a FC port, a SAS port, a FCoE port, or any other type of port. The port may be integrated with the motherboard of the computer. For example, many computers include a LAN on Motherboard (LOM) which provides Ethernet functionality integrated with the motherboard. In other cases, the port may be included on an expansion card. For example, Ethernet cards are available that plug into expansion slots on a computer to provide the desired functionality. In either case, the functionality of the port may be relatively independent of the state of the computer.

For example, in the case of an Ethernet port, the port may establish communications with the network independent of the operational state of the computer. As long as the port (integrated or on an expansion card) is receiving power, the connection may be established. The ability of the port to remain active even when the computer itself is powered down allows for functionality such as Wake on LAN, in which the computer powers down until a specific packet is received over the network, which then causes the computer to power up. What should be understood is that the operation of the port is independent of the computer, or more particularly, of the operating system running on the computer.

Coupled to the network port may be a visual indicator. A typical visual indicator is LED 114, although the techniques described herein are not limited to LEDs. Any visual indicator that is activated by an electrical signal, such as a light bulb, could also be used. In addition, it is also possible for the indicator to be an audio indicator, such as a speaker. The network port may determine the operational status of the port and turn the LED on or off as appropriate. For example, in the case of an Ethernet port, if a link to the network has been established, the network port may set the signal controlling the LED to turn the LED on. If traffic is flowing through the port, the LED may be cycled on and off to reflect the rate at which traffic is flowing. Regardless of the particular information conveyed, it should be understood that the on/off state of the LED is controlled by the network port.

System 100 may also include a baseband management controller (BMC) 130. As explained above, the BMC is a separate processor that runs independently of the computer 110. The BMC may be coupled to various points in the computer to obtain status information from the computer. In some cases, the status information may be provided by an application running on the computer under the control of the operating system. However, as explained above, such applications may not be able to run when the operating system is not running.

The BMC may also include an input 132. As the BMC is a processor, the typical functionalities available to a processor are also present. One of these functionalities is input pins that are capable of receiving external signals. For example, the BMC may include one or more general purpose input/output (GPIO) pins. The GPIO pins may allow the BMC to be coupled to external signals and the status of those signals is available to the BMC.

The input 132 may be electrically coupled to the signal that drives the LED 114. Thus, if the LED has been turned on by the network port, this status is available to the BMC through the input 132. Likewise, if the LED is off, the status is known by the BMC. It should be understood that because the BMC is coupled to the same signal that is driving the LED, the status of the LED as determined by the BMC will be the same as the physical on/off status of the LED. The LED status information may then be sent to a management device, as will be explained in further detail below.

Figure 2:
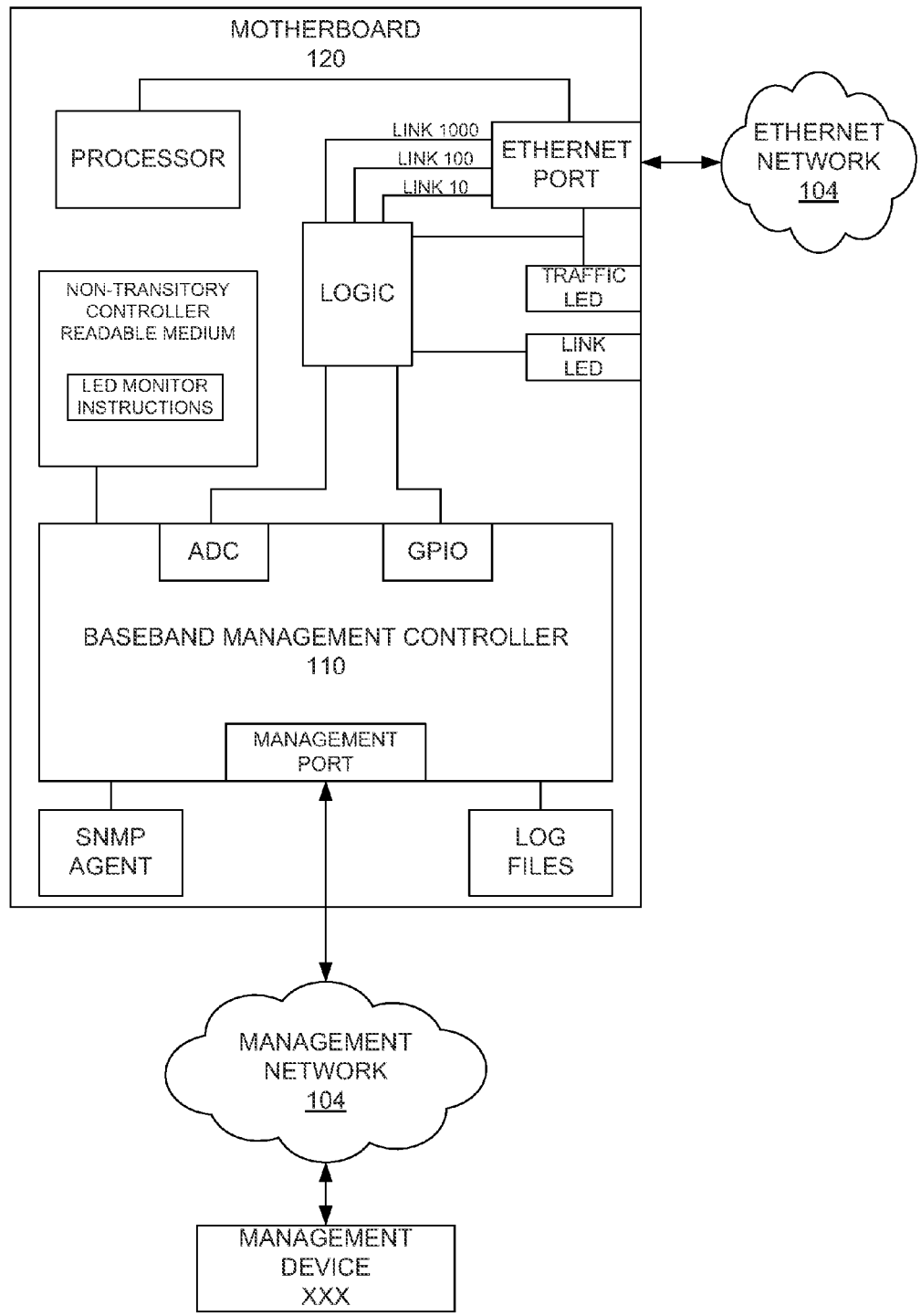
FIG. 2 is another example of a system including a coupling to a visual indicator.

FIG. 2 is another example of a system including a coupling to a visual indicator. For purposes of this description, FIG. 2 describes a motherboard 220 which houses both the computer components as well as the BMC. It should be understood that the particular layout of components is not important, and FIG. 2 is presented as an example of a possible implementation. The motherboard may contain a processor 210. The processor is the component of the computer that provides processing capabilities. In other words, the processor may be thought of as the computer 110 depicted in FIG. 1.

Coupled to the processor may be a port 212. As shown, port 212 is an Ethernet port. However, it should be understood that this is for purposes of explanation and not limitation. Any other types of ports may also use the techniques described herein. In this example, the Ethernet port may be connected to an Ethernet network 250 to allow communications between the processor and any other elements (not shown) attached to the Ethernet network. The port may provide a plurality of output signals intended to control LEDs. For example, the port may provide three signals, Link 1000, Link 100, and Link 10, to indicate if the port is currently connected at 1000, 100, or 10 Megabits per second. These signals may be coupled to logic 216. The logic may be electrical components that process the input signals to determine which of LEDs 214, 215 should be turned on/off. For example, although there are three Link signals, each indicating the current operating speed of the port, this level of granularity may not be needed for controlling the LED. The LED may reflect if a link is established or not, regardless of the speed. The logic may logically "OR" these signals together, and if any of the signals are set, the LED may be turned on.

The port may also include a traffic signal 218 coupled to a traffic LED 214. When traffic flows through the port, the on/off state of the LED may be varied based on the rate at which traffic is flowing. In other words, the LED may blink at a rate that is related to the amount of traffic flowing through the port. This signal may also be coupled to the logic 216.

The motherboard 220 may also include a BMC 230. Coupled to the BMC may be a non-transitory controller readable medium 236 which contains a set of BMC executable instructions thereon. For example, these instructions may include LED monitor instructions 238. The instructions may be executed by the BMC to provide the functionality described herein. The BMC may also include input ports. For example, the BMC may include a GPIO input port 232. A GPIO input port may allow the BMC to receive an external signal, such as a voltage level. The GPIO port may be coupled to the logic 216 in order to receive the on/off state of one of the LEDs. Thus, the BMC may be able to determine the status of the port by examining the status of the LED as presented to the GPIO input.

The BMC may also contain an ADC input 234. An ADC input may take a time varying signal and convert it to a digital format. For example, a blinking LED may blink with a certain frequency. The ADC may receive the signal driving the blinking LED and convert this to a numerical representation of the blink frequency. A counting circuit may also be used to determine the blink frequency. This frequency may be related to the port status, such as by indicating how much traffic is flowing through the port. Once again, the BMC is able to obtain information that is output through the LEDs by an electrical coupling to the signal that drives the LED.

The BMC may also include a management port 240. The management port may allow the BMC to connect to a management network 260. The management network may be separate from the Ethernet network 250, thus providing isolation between the two networks. Coupled to the management network may be a management device 270. The management device may be a device, such as a computer, mobile phone, tablet, or any other type of device that is able to receive information from and send information to the management network. The management device may run management application software that allows the management device to retrieve status information from the BMC.

In operation, the port 212 may have a status that is visually represented by the LEDs 214,215. The electrical signals driving the LEDs may be coupled, through logic, to the input ports of the BMC. Thus, the BMC is able to determine the on/off states of the LEDs. The BMC may take this information an make it available to management devices over the management network. For example, the BMC may run a simple network management protocol (SNMP) agent 242. As the status of the LEDs changes, this information may be conveyed to a management device through the normal SNMP protocol.

As another example, the BMC may contain log files 244. The BMC may store the status of the LEDs in the log file. At some point in time, the management device may access the BMC through the management network to retrieve the log files. Thus, a historic state of the LEDs may be maintained and retrieved. In addition, the BMC may directly be queried by the management device to return the current status of the LEDs.

Figure 3:
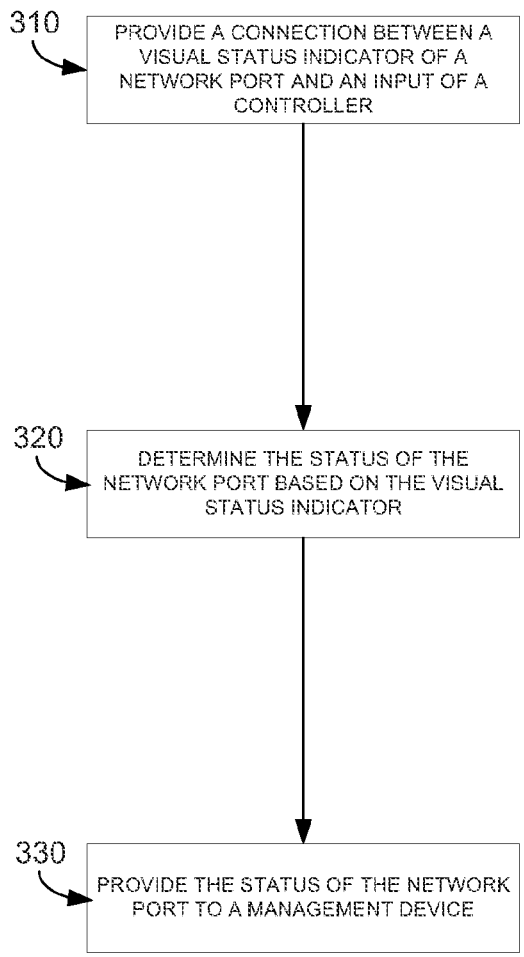
FIG. 3 is an example flow diagram of obtaining status of a port.

FIG. 3 is an example flow diagram of obtaining status of a port. In block 310, a connection between a visual status indicator of a network port and an input of a controller may be provided. For example, the visual status indictor may be an LED. The controller may be a BMC. The connection may be coupling the input of the LED with one of the inputs of the BMC.

In block 320, the status of the network port may be determined based on the visual status indicator. For example, the BMC may be able to determine if the LED is on or off based on the input signal provided by the connection described above. In block 330, the status of the network port may be provided to a management device. As explained above, once the BMC has obtained the status of the LED, which in turn determines the status of the network port, this information may be made available to a remote management device. For example, the remote management device may receive the status information through SNMP, through a log file, or through a direct query of the BMC.

We claim:

1. A system comprising:
a controller including an input for receiving a signal;
a port including a visual indicator to indicate an operational status of the port; and
a logic to combine a plurality of visual status indicators of the port into the input to the controller.

2. The system of claim 1 wherein the visual indicator is a light emitting diode.

3. The system of claim 1 wherein the port is an Ethernet port.

4. The system of claim 1 wherein the input is a general purpose input/output of a baseband management controller.

5. The system of claim 1 wherein the input is an analog to digital converter input of a baseband management controller.

6. A device comprising:
a processor on a motherboard;
a network connection port coupled to the motherboard, the network connection port including a visual status indicator, the visual status indicator indicating an operational status of the network connection;
a logic to combine a plurality of visual status indicators, of the port into the input to the controller; and
a baseband management processor coupled to the logic to determine the operational status of the network connection.

7. The device of claim 6 wherein the visual status indicator is a light emitting diode and the network connection is an Ethernet connection.

8. The device of claim 6 further comprising:
a log file coupled to the baseband management controller, the log file to store the operational status of the network connection.

9. The device of claim 6 further comprising:
a simple network management protocol agent running on the baseband management controller to report the operational status of the network connection.

10. The device of claim 6 wherein the baseband management controller is further coupled to a management network, wherein the operational status of the network connection is retrieved by management software running on a host coupled to the management network.

11. A method comprising:
providing a connection between a visual status indicator of a network port and an input of a controller;
determining, with the controller, the status of the network port based on the visual status indicator;
providing logic to combine a plurality of visual status indicators of the network port into a smaller number of inputs to the controller; and
providing, with the controller, the status of the network port to a management device.

12. The method of claim 11, wherein the input of the controller is a general purpose input, further comprising:
determining if the general purpose input is in a high or low logic state, wherein the logic state determines the status of the network port.

13. The method of claim 11 wherein the input of the controller is a digital to analog conversion input, further comprising:
determining a frequency of change of the visual status indicator, wherein the frequency determines the status of the network port.

14. The method of claim 11 wherein the network port is an Ethernet port.

* * * * *

UNITED STATES PATENT AND TRADEMARK OFFICE
CERTIFICATE OF CORRECTION

PATENT NO. : 8,976,033 B2  
APPLICATION NO. : 13/760902  
DATED : March 10, 2015  
INVENTOR(S) : Darren J. Cepulis et al.

Page 1 of 1

It is certified that error appears in the above-identified patent and that said Letters Patent is hereby corrected as shown below:

Claims

In column 6, line 16, in Claim 6, delete "indicators," and insert -- indicators --, therefor.

In column 6, line 52, in Claim 13, delete "11" and insert -- 11, --, therefor.

Signed and Sealed this
Twentieth Day of October, 2015

Michelle K. Lee
*Director of the United States Patent and Trademark Office*